United States Patent
Smith

(10) Patent No.: US 6,568,045 B2
(45) Date of Patent: May 27, 2003

(54) EASILY INSERTABLE V-SHAPED SEALING FASTENER

(75) Inventor: Walter Michael Smith, Lake Zurich, IL (US)

(73) Assignee: Termax Corporation, Schaumburg, IL (US)

( * ) Notice: Subject to any disclaimer, the term of this patent is extended or adjusted under 35 U.S.C. 154(b) by 0 days.

(21) Appl. No.: 10/029,358

(22) Filed: Oct. 23, 2001

(65) Prior Publication Data

US 2002/0069492 A1 Jun. 13, 2002

Related U.S. Application Data

(60) Provisional application No. 60/255,167, filed on Dec. 13, 2000.

(51) Int. Cl.[7] .......................... A44B 21/00; F16L 33/00
(52) U.S. Cl. ......................................................... 24/295
(58) Field of Search .................. 24/458, 289, 293–296

(56) References Cited

U.S. PATENT DOCUMENTS

| | | | |
|---|---|---|---|
| 2,322,656 A | 6/1943 | Murphy | 24/73 |
| 2,329,688 A | 9/1943 | Bedford, Jr. | 189/88 |
| 2,607,971 A | 8/1952 | Bedford, Jr. | 24/73 |
| 2,825,948 A | 3/1958 | Parkin | 24/73 |
| 3,673,643 A | 7/1972 | Kindell | 24/73 B |
| 3,864,789 A | 2/1975 | Leitner | 24/73 MF |
| 4,609,170 A | 9/1986 | Schnabl | 248/71 |
| 5,373,611 A | 12/1994 | Murata | 24/297 |
| 5,422,789 A | 6/1995 | Fisher et al. | 361/719 |
| 5,542,158 A | 8/1996 | Gronau et al. | 24/295 |
| 5,887,319 A | 3/1999 | Smith | 24/293 |
| 5,987,714 A | 11/1999 | Smith | 24/295 |

Primary Examiner—James R. Brittain
(74) Attorney, Agent, or Firm—E. Vassiliou

(57) ABSTRACT

A spring fastener for securing one or more sheets of material on another sheet of material having a V-shaped clip, which clip has two sides. Preferably, one of the sides has a wide angle bent, while the other side has one or more embosses and/or recesses. The fastener also comprises an elastic body extending from the vicinity of the top section of the V-shaped clip to at least one of the embosses. Examples of elastic bodies are foamed or un-foamed plastisol, polyurethane, silicone, thermoplastic elastomer, and a combination thereof. The substantially central part of the elastic body, between the first side and the second side of the V-shaped comprises a cavity with a closed cavity bottom, thus providing to the fastener easy insertion to an opening of a first rigid sheet, combined with unexpectedly improved sealing performance.

40 Claims, 1 Drawing Sheet

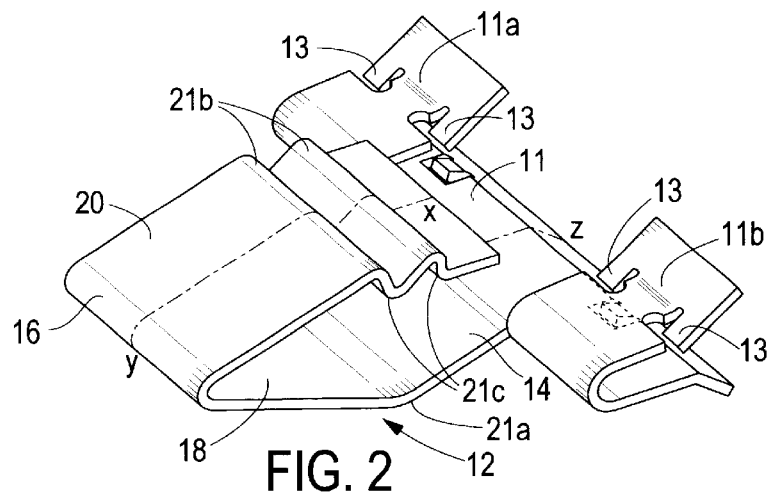
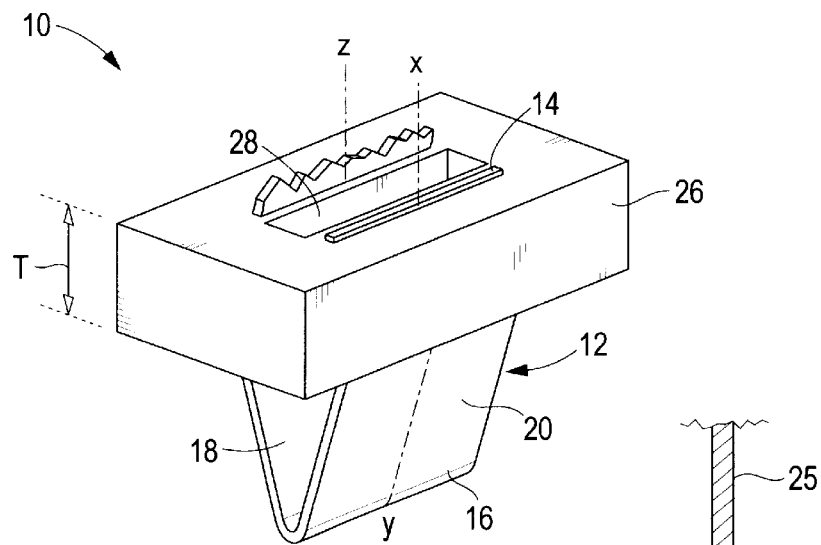
FIG. 2
FIG. 1
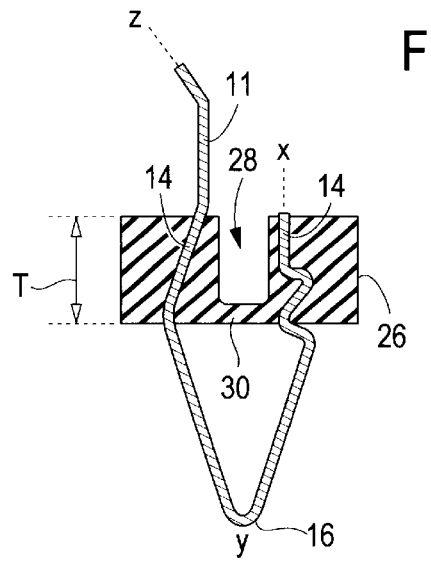
FIG. 3
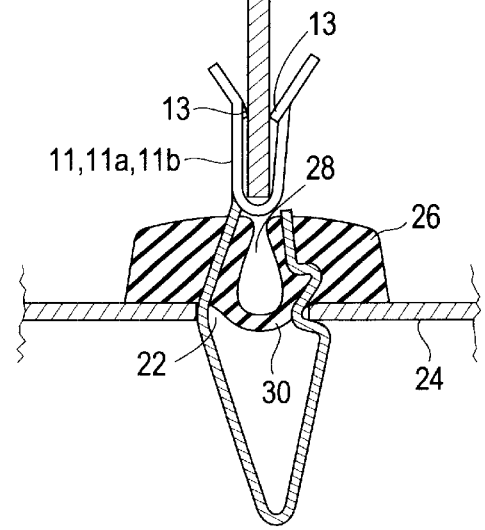
FIG. 4

EASILY INSERTABLE V-SHAPED SEALING FASTENER

RELATED APPLICATIONS

This application claims priority of provisional patent application 60/255,167, filed Dec. 13, 2000, which is incorporated herein by reference in its entirety.

FIELD OF THE INVENTION

This invention relates to spring fasteners, and more particularly to those fasteners characterized by self-sealing properties and reversible quick-lock mechanisms.

BACKGROUND OF THE INVENTION

A number of fasteners have been used in the past for securing one object on another object, as for example, securing an article such as for example a rigid plastic sheet on a metal or other rigid plastic sheet. The word "rigid" stands for "non-elastomeric" for the purposes of this invention. However, the fasteners being used presently are particularly designed for only a limited number of matching objects to be secured on each other. For sealing purposes, a secondary resilient sheet, or a resilient body attached to the fastener may be used.

Examples of conventional fasteners are disclosed in U.S. Pat. No. 5,542,158 (Gronau et al.); U.S. Pat. No. 5,422,789 (Fisher et al.), U.S. Pat. No. 5,373,611 (Murata); U.S. Pat. No. 4,609,170 (Schnabl); U.S. Pat. No. 3,864,789 (Leitner); U.S. Pat. No. 3,673,643 (Kindell); U.S. Pat. No. 2,825,948 (Parkin); U.S. Pat. No. 2,607,971 (Bedford, Jr.); U.S. Pat. No. 2,329,688 (Bedford, Jr.); U.S. Pat. No. 2,322,656 (Murphy), among others.

U.S. Pat. No. 5,987,714 (Smith), which is incorporated herein by reference, discloses a fastener which has a resilient or elastic body molded on the fattener for sealing purposes. The molded resilient body provides a considerable advance in the art, but for a number of applications, insertion of the fastener into a respective opening on a rigid sheet becomes necessarily more difficult, as it will be seen hereinbelow.

A major object of the present invention is to provide a fastener with excellent sealing properties without substantially increasing the force needed to insert the fastener into an opening of a rigid sheet, as compared to inserting the same fastener lacking the molded elastic body.

SUMMARY OF THE INVENTION

As aforementioned, this invention relates to spring fasteners, and especially to those fasteners characterized by self-sealing properties and reversible quick-lock mechanisms. More particularly, this invention pertains a fastening device comprising a V-shaped clip having a top section, a bottom section, a first side and a second side, each of the first side and the second side of the V-shaped clip having a securing element, the securing element of each side disposed closer to the top section than to the bottom section, and engageable to an opening of a first rigid sheet, thereby securing the fastening device on the first rigid sheet by the securing element, the fastening device also comprising a molded elastic body extending in thickness from the vicinity of the top section to at least one securing element, which securing element is located closest to the top section, the molded elastic body comprising a cavity between the first side and the second side of the V-shaped clip, the cavity having a closed cavity bottom.

Preferably, the elastic body extends in thickness far enough to cover all embosses and/or recesses. Also, preferably, the elastic body comprises a foamed or un-foamed polymer selected from a group consisting of plastisol, polyurethane, silicone, thermoplastic elastomer, and a combination thereof.

The securing element preferably comprises a structure selected from a group consisting essentially of a wide angle bent, an emboss, a recesses, and a combination thereof, and more preferably, the securing element of the first side is substantially parallel to the securing element of the second side.

In a preferred embodiment of the instant invention, the securing element of the first side comprises a wide bent angle and the securing element of the second side comprises a structure selected from a group consisting essentially of an emboss, a recesses, and a combination thereof.

The fastening device may further comprise an upper clip, the upper clip being integrally connected to the first side of the V-shaped clip.

This invention also relates to a vehicle comprising two objects connected with any of the fasteners in any of the variations described above.

DESCRIPTION OF THE DRAWING

The reader's understanding of practical implementation of preferred embodiments of the invention will be enhanced by reference to the following detailed description taken in conjunction with perusal of the drawing figures, wherein:

FIG. 1 shows a fragmental perspective view of a fastening device according to a highly preferred embodiment of the present invention.

FIG. 2 is a perspective view of an example of the spring fastener (without the elastic body, for purposes of clarity) of FIG. 1, wherein the V-shaped clip comprises an upper clip integrally connected to the V-shaped clip FIG. 3 shows a cross sectional view of the spring fastener of FIG. 2 (with the elastic body, which is not shown if FIG. 2, but is shown in FIG. 1), along line X-Y-Z.

FIG. 4 shows a combination view comprising a side view of the upper clip with cross sectional view of all other elements along line X-Y-Z.

DETAILED DESCRIPTION OF THE INVENTION

As aforementioned, this invention relates to spring fasteners, and especially to those fasteners characterized by self-sealing properties and reversible quick-lock mechanisms.

Referring now to FIGS. 1–4, there is depicted a fastening device 10 according to a preferred embodiment of the instant invention. The fastening device 10 comprises a V-shaped clip 12 having a top section 14 a bottom section 16, a first side 18 and a second side 20.

Each of the first side 18 and second side 20 may have a securing element (collectively 21), which is preferably selected from a group consisting of a wide angle 21a, an emboss 21b, a recess 21c, and a combination thereof. For purposes of simplicity and exemplification, a wide angle 21a is shown to be located on the first side 18, while embosses 21b and recesses 21c are shown to be located on the second side 20 of the V-shaped. Although this is a preferred configuration, any of the securing elements could be located on any side.

The securing elements are preferably located closer to the top section 14 than to the bottom section 16 of the V-shaped clip 12.

The fastening device 10, further comprises an elastic body 26, molded onto the V-shaped clip 12. The elastic body 26 has a thickness T extending from the vicinity of the top section 14 to at least one securing element, which securing element is closest to the top section 14, as compared to the other securing elements. Preferably, the elastic body 26 covers all securing elements.

The molded elastic body 26 comprises a cavity 28 between the first side 18 and the second side 20 of the V-shaped clip 12. The cavity has a closed cavity bottom 30, as better shown in FIG. 3. As explained earlier, FIG. 3 shows a cross sectional view of the spring fastener of FIG. 2 (with the elastic body, which is not shown if FIG. 2, but is shown in FIG. 1), along line X-Y-Z.

In a preferred embodiment of the instant invention, the fastening device 10 may further comprise an upper clip 11, better shown in FIG. 2, wherein the elastic body 26 is not shown for purposes of clarity. The upper clip 11 is integrally connected to the first side 18 of the V-shaped clip 12, and preferably comprises a first sub-clip 11*a* and a second sub-clip 11*b*. The sub-clips 11*a* and 11*b* have a U-shaped structure and barbs 13, so that they can accept and hold a second rigid sheet 25 within the U-shaped structure.

The operation of this embodiment is illustrated in FIG. 4, which depicts a rigid panel, such as for example a steel panel 24, having an opening 22. The fastening device shown in FIGS. 1–3 is inserted by the operator into the opening 22 far enough to provide a snuggle fit. Due to the empty space created by the cavity 28, the two sides 18 and 20 move easily toward each other during the insertion of the fastening device 10 into the opening, thereby greatly facilitating said insertion as compared to the insertion of a fastening device lacking the cavity 28. In addition to the fact that the insertion of the fastening device is greatly facilitated by the presence of the cavity 28, an unexpected advantage also is created. This advantage is improvement of the sealing properties of the fastener.

It is believed that since the bottom 30 of the cavity 28 has a considerably smaller thickness than the elastic body 26, said bottom flexes considerably more easily than a similar portion of an elastic body lacking said cavity, and therefore provides considerably better sealing performance. This, however, is an assumption, and should not limit the scope of the claims of this invention.

In sequence the second rigid sheet 25 is inserted into the U-shaped sub-clips 11*a* and 11*b*. It is evident, however, that this sequence may be reversed.

According to this invention, in addition to easy insertion and highly improved sealing performance provided regarding both liquid and gas leakage between the two sides of a panel, such as panel 24 for example, squeaking and other similar noises, very common to vehicles, are substantially prevented.

Cars or other vehicles may be made, comprising objects connected together by one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

What is claimed is:

1. A fastening device comprising a V-shaped clip having a top section, a bottom section, a first side and a second side, each of the first side and the second side of the V-shaped clip having a securing element, the securing element of each side disposed closer to the top section than to the bottom section, and engageable to an opening of a first rigid sheet, thereby securing the fastening device on the first rigid sheet by the securing element, the fastening device also comprising a molded elastic body extending in thickness from the vicinity of the top section to at least one securing element, which securing element is located closest to the top section, the molded elastic body comprising a cavity between the first side and the second side of the V-shaped clip, the cavity having a closed cavity bottom.

2. A fastening device as defined in claim 1, wherein the securing element comprises a structure selected from a group consisting essentially of a wide angle bent, an emboss, a recesses, and a combination thereof.

3. A fastening device as defined in claim 2, wherein the securing element of the first side is substantially parallel to the securing element of the second side.

4. A fastening device as defined in claim 3, wherein the securing element of the first side comprises a wide bent angle and the securing element of the second side comprises a structure selected from a group consisting essentially of an emboss, a recesses, and a combination thereof.

5. A fastening device as defined in claim 4, further comprising an upper clip, the upper clip being integrally connected to the first side of the V-shaped clip.

6. A fastening device as defined in claim 5, wherein the elastic body comprises a foamed or un-foamed polymer selected from a group consisting of plastisol, polyurethane, silicone, thermoplastic elastomer, and a combination thereof.

7. A fastening device as defined in claim 4, wherein the elastic body comprises a foamed or un-foamed polymer selected from a group consisting of plastisol, polyurethane, silicone, thermoplastic elastomer, and a combination thereof.

8. A fastening device as defined in claim 3, wherein the elastic body comprises a foamed or un-foamed polymer selected from a group consisting of plastisol, polyurethane, silicone, thermoplastic elastomer, and a combination thereof.

9. A fastening device as defined in claim 3, further comprising an upper clip, the upper clip being integrally connected to the first side of the V-shaped clip.

10. A fastening device as defined in claim 9, wherein the elastic body comprises a foamed or un-foamed polymer selected from a group consisting of plastisol, polyurethane, silicone, thermoplastic elastomer, and a combination thereof.

11. A fastening device as defined in claim 2, wherein the securing element of the first side comprises a wide bent angle and the securing element of the second side comprises a structure selected from a group consisting essentially of an emboss, a recesses, and a combination thereof.

12. A fastening device as defined in claim 11, further comprising an upper clip, the upper clip being integrally connected to the first side of the V-shaped clip.

13. A fastening device as defined in claim 12, wherein the elastic body comprises a foamed or un-foamed polymer selected from a group consisting of plastisol, polyurethane, silicone, thermoplastic elastomer, and a combination thereof.

14. A fastening device as defined in claim 11, wherein the elastic body comprises a foamed or un-foamed polymer selected from a group consisting of plastisol, polyurethane, silicone, thermoplastic elastomer, and a combination thereof.

15. A fastening device as defined in claim 2, further comprising an upper clip, the upper clip being integrally connected to the first side of the V-shaped clip.

16. A fastening device as defined in claim 15, wherein the elastic body comprises a foamed or un-foamed polymer selected from a group consisting of plastisol, polyurethane, silicone, thermoplastic elastomer, and a combination thereof.

17. A fastening device as defined in claim 2, wherein the elastic body comprises a foamed or un-foamed polymer selected from a group consisting of plastisol, polyurethane, silicone, thermoplastic elastomer, and a combination thereof.

18. A fastening device as defined in claim 1, wherein the elastic body comprises a foamed or un-foamed polymer selected from a group consisting of plastisol, polyurethane, silicone, thermoplastic elastomer, and a combination thereof.

19. A fastening device as defined in claim 1, further comprising an upper clip, the upper clip being integrally connected to the first side of the V-shaped clip.

20. A fastening device as defined in claim 19, wherein the elastic body comprises a foamed or un-foamed polymer selected from a group consisting of plastisol, polyurethane, silicone, thermoplastic elastomer, and a combination thereof.

21. A vehicle comprising a fastening device connecting elements of the vehicle, the fastening device comprising a V-shaped clip having a top section, a bottom section, a first side and a second side, each of the first side and the second side of the V-shaped clip having a securing element, the securing element of each side disposed closer to the top section than to the bottom section, and engageable to an opening of a first rigid sheet, thereby securing the fastening device on the first rigid sheet by the securing element, the fastening device also comprising a molded elastic body extending in thickness from the vicinity of the top section to at least one securing element, which securing element is located closest to the top section, the molded elastic body comprising a cavity between the first side and the second side of the V-shaped clip, the cavity having a closed cavity bottom.

22. A vehicle as defined in claim 21, wherein the securing element comprises a structure selected from a group consisting essentially of a wide angle bent, an emboss, a recesses, and a combination thereof.

23. A vehicle as defined in claim 22, wherein the securing element of the first side is substantially parallel to the securing element of the second side.

24. A vehicle as defined in claim 23, wherein the securing element of the first side comprises a wide bent angle and the securing element of the second side comprises a structure selected from a group consisting essentially of an emboss, a recesses, and a combination thereof.

25. A vehicle as defined in claim 24, wherein the fastening device further comprises an upper clip, the upper clip being integrally connected to the first side of the V-shaped clip.

26. A vehicle as defined in claim 25, wherein the elastic body comprises a foamed or un-foamed polymer selected from a group consisting of plastisol, polyurethane, silicone, thermoplastic elastomer, and a combination thereof.

27. A vehicle as defined in claim 24, wherein the elastic body comprises a foamed or un-foamed polymer selected from a group consisting of plastisol, polyurethane, silicone, thermoplastic elastomer, and a combination thereof.

28. A vehicle as defined in claim 23, wherein the fastening device further comprises an upper clip, the upper clip being integrally connected to the first side of the V-shaped clip.

29. A vehicle as defined in claim 28, wherein the elastic body comprises a foamed or un-foamed polymer selected from a group consisting of plastisol, polyurethane, silicone, thermoplastic elastomer, and a combination thereof.

30. A vehicle as defined in claim 23, wherein the elastic body comprises a foamed or un-foamed polymer selected from a group consisting of plastisol, polyurethane, silicone, thermoplastic elastomer, and a combination thereof.

31. A vehicle as defined in claim 22, wherein the securing element of the first side comprises a wide bent angle and the securing element of the second side comprises a structure selected from a group consisting essentially of an emboss, a recesses, and a combination thereof.

32. A vehicle as defined in claim 31, wherein the fastening device further comprises an upper clip, the upper clip being integrally connected to the first side of the V-shaped clip.

33. A vehicle as defined in claim 32, wherein the elastic body comprises a foamed or un-foamed polymer selected from a group consisting of plastisol, polyurethane, silicone, thermoplastic elastomer, and a combination thereof.

34. A vehicle as defined in claim 31, wherein the elastic body comprises a foamed or un-foamed polymer selected from a group consisting of plastisol, polyurethane, silicone, thermoplastic elastomer, and a combination thereof.

35. A vehicle as defined in claim 22, wherein the fastening device further comprises an upper clip, the upper clip being integrally connected to the first side of the V-shaped clip.

36. A vehicle as defined in claim 35, wherein the elastic body comprises a foamed or un-foamed polymer selected from a group consisting of plastisol, polyurethane, silicone, thermoplastic elastomer, and a combination thereof.

37. A vehicle as defined in claim 22, wherein the elastic body comprises a foamed or un-foamed polymer selected from a group consisting of plastisol, polyurethane, silicone, thermoplastic elastomer, and a combination thereof.

38. A vehicle as defined in claim 21, wherein the fastening device further comprises an upper clip, the upper clip being integrally connected to the first side of the V-shaped clip.

39. A vehicle as defined in claim 38, wherein the elastic body comprises a foamed or un-foamed polymer selected from a group consisting of plastisol, polyurethane, silicone, thermoplastic elastomer, and a combination thereof.

40. A vehicle as defined in claim 21, wherein the elastic body comprises a foamed or un-foamed polymer selected from a group consisting of plastisol, polyurethane, silicone, thermoplastic elastomer, and a combination thereof.

* * * * *